(12) United States Patent
Barsellotti et al.

(10) Patent No.: US 6,177,849 B1
(45) Date of Patent: Jan. 23, 2001

(54) NON-SATURATING, FLUX CANCELLING DIPLEX FILTER FOR POWER LINE COMMUNICATIONS

(75) Inventors: John Barsellotti, Kanata; Mike McGinnis, Carleton Place, both of (CA)

(73) Assignee: OneLine AG (DE)

( * ) Notice: Under 35 U.S.C. 154(b), the term of this patent shall be extended for 0 days.

(21) Appl. No.: 09/195,424

(22) Filed: Nov. 18, 1998

(51) Int. Cl.$^7$ .................................................. H03H 7/09
(52) U.S. Cl. ................................... 333/177; 333/185
(58) Field of Search ................................ 333/175, 177, 333/181, 185

(56) References Cited

U.S. PATENT DOCUMENTS 1,481,945  *  1/1924  Weinberger ........................ 333/175

FOREIGN PATENT DOCUMENTS

| | | | |
|---|---|---|---|
| 2521810 | * | 11/1976 | (DE) ...................................... 333/177 |
| 2638182 | * | 3/1978 | (DE) ...................................... 333/177 |
| 3545405 | * | 7/1987 | (DE) ...................................... 333/177 |
| 0 302 746 | | 2/1989 | (EP) . |
| 98 28858 | | 7/1998 | (WO) . |

* cited by examiner

*Primary Examiner*—Justin P. Bettendorf
(74) *Attorney, Agent, or Firm*—Milbank, Tweed, Hadley & McCloy LLP

(57) ABSTRACT

A power line communications filter has an input terminal, an output terminal, and a common terminal. A transformer has primary and secondary windings, each having one end connected to the respective input and output terminals, and another end connected to a common connection. The windings are wound on a high permeability magnetic core in such a way as to promote flux leakage and with a winding polarity such that flux cancellation occurs when current flows through the windings in series. A capacitor is connected between the common terminal and the common connection of the primary and secondary windings. The capacitor has a large impedance at low frequencies such that low frequency current flows through both the windings in series and flux cancellation occurs.

10 Claims, 5 Drawing Sheets

NON-SATURATING, FLUX CANCELLING DIPLEX FILTER FOR POWER LINE COMMUNICATIONS

FIELD OF THE INVENTION

This invention relates to the field of filters, and more particularly to a non-saturating, flux canceling filter for power line communications.

BACKGROUND OF THE INVENTION

As competition in the telecommunications market continues to grow, new ways are being sought to deliver telecommunications services, for example, Internet access to users. One way that is attractive for the power supply utilities is to deliver telecommunications services over power lines at frequencies over 1 MHz. Buried cable and short overhead drops are capable of carrying signals at these frequencies, but a major problem is wiring in the home. Such wiring is neither shielded nor twisted and is mainly above ground. It is thus a major source of interference, particularly at the frequencies used for shortwave broadcast, amateur radio, and airborne navigation. A filter is needed at the point of entry into the home. Given the huge difference in frequency between the power line, 60Hz and the signal, greater than 1 MHz, it would appear at first sight that it should not be difficult to construct such a filter. The problem arises from the fact that the low pass filter, carrying the power supply, has to carry huge currents, up to 200 Amperes, so that to avoid saturation the core would have to be physically enormous. Given the second order relationship between heat and current, any small resistive load in the filter will translate in the generation of a large amount of heat that not only has to be dissipated, but also wastes energy.

SUMMARY OF THE INVENTION

According to the present invention there is provided a power line communications filter, comprising an input terminal, an output terminal, and a common terminal; a transformer having primary and secondary windings, each having one end connected to said respective input and output terminals, and another end connected to a common connection, said windings being wound on a high permeability magnetic core in such a way as to promote flux leakage and with a winding polarity such that flux cancellation occurs when current flows through said windings in series; and a capacitor between said common terminal and said common connection of said primary and secondary windings, said capacitor having a large impedance at low frequencies such that low frequency current flows through both said windings in series and flux cancellation occurs.

Preferably, the capacitor and transformer should resonate at about 1 to 5 KHz. Resonance is an unwanted side effect. Since high frequency roll off begins above this frequency, it should be as low as possible without affecting operation at power line frequencies. There are some rare cases where the third harmonic power (180 Hz) exceeds the fundamental power. For this reason, the filter should be essentially lossles well beyond 180 Hz (and possibly even the $5^{th}$ harmonic at 300 Hz). As the frequency is moved higher, the attenuation at high frequencies is reduced.

At low frequencies the transformer essentially behaves like a single piece of wire because there is effectively an open circuit between the common connection and said common terminal. The current flows in series through the primary and secondary windings. Due to the flux canceling configuration, the inductance of the windings is canceled out and there is near zero loss.

At high frequencies, the capacitor effectively provides a closed circuit and the filter behaves like a signal transformer with good roll off.

Contrary to conventional transformer design, where the object is to reduce leakage inductance by bringing the primary and secondary into close proximity, sometimes with bifilour or interleaved windings and having a short magnetic path, the present invention seeks to achieve the opposite effect. The core geometry preferably ensures maximum physical separation of the primary and secondary coils by winding them at opposite ends of the core, and also ensures a long magnetic path. Leakage inductance increases with the length per turn, so a larger cross section can be used to increase the length of the wire.

The magnetic core should be made of a material having a high permeability up to the operating frequency. A suitable choice is Fair-Rite Corp Type 43, which has a permeability factor of approximately 800 at frequencies up to 5 MHz. The permeability should be as high as possible to achieve higher attenuation at high frequencies, reduce the number of turns to reduce the loss at low frequencies, and reduce the size, weight and cost of the unit.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
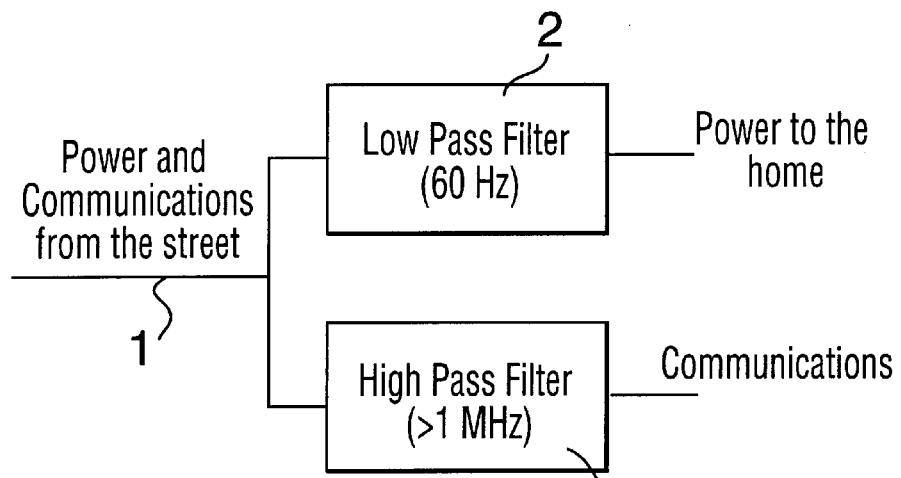
FIG. 1 is a high level block diagram of a power line diplex filter.

At present power line communications use radio frequencies at 50 kHz to 200 kHz to transmit communication signals over electric cables. It has been discovered that cable performance improves at frequencies above 1 MHz. The signals are separated from the power using a point-of-entry filter as shown in FIG. 1.

Power and communications come in from the street on line 1. The power is separated by the low pass filter 2 and the communications signals are separated by high pass filter 3. The low pass filter 2 should pass 60 Hz and the high pass filter 3 should pass signals above about 1 MHz.

Figure 2:
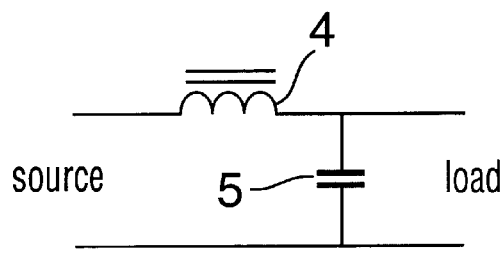
FIG. 2 shows a simple low pass filter in accordance with the prior art.

A simple low pass filter consisting of inductance 4 and capacitor 5 is shown in FIG. 2. This simple filter is not practicable at currents of up to 200 Amps at 60 Hz because in order to avoid saturation, the core would have to be enormous in physical size. This problem is similar to the classic problem of having to support a DC current in a transformer, for example, a telephone current feed. The classic solution is to introduce an air gap and then increase the core size to compensate for the reduced permeability. This solution is not adequate in this extreme case.

Figure 3:
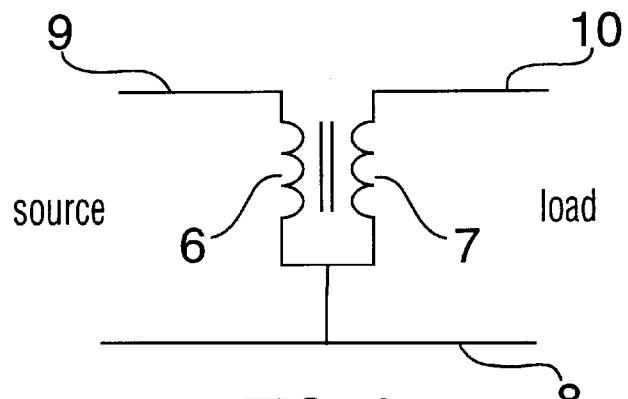
FIG. 3 shows an ordinary signal transformer in accordance with the prior art.
Figure 4:
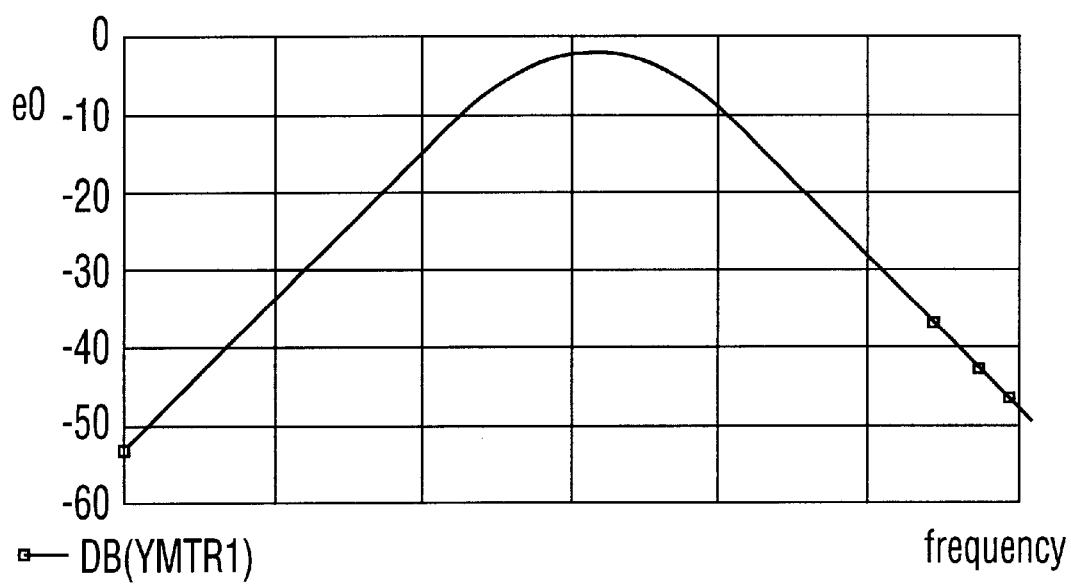
FIG. 4 shows the frequency response for the transformer of FIG. 3.

The filter shown in FIG. 3 is an ordinary signal transformer having a primary inductance of about 1 mH. This has primary and secondary windings 6, 7, a common line 8, and input and output lines 9, 10. The transformer has a frequency response as shown in FIG. 4. This shows that the high frequency roll off provides about 28 dB of attenuation at 1 MHz, while the unwanted low frequency roll off is about 40 dB at 60 Hz.

Figure 5:
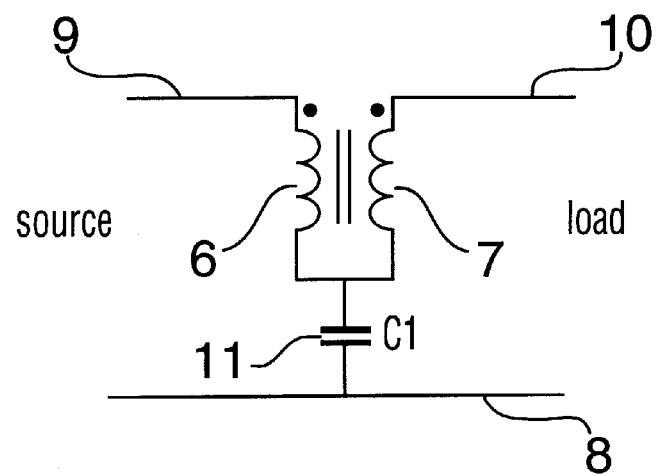
FIG. 5 shows a filter in accordance with the principles of the invention.

The effect of adding a 0.1 $\mu$ capacitor 11 (C1) is shown in FIG. 5. The transformer and capacitor resonate at about 5 kHz. For frequencies above about 20 kHz, the frequency response of the arrangement is essentially the same as for the transformer alone because the capacitor has a low impedance. However, for frequencies below about 2 kHz, the capacitor has a high impedance and the circuit behaves as if the capacitance is an open circuit. As a result the current flows through both windings, which are arranged in opposition, in series. This causes flux cancellation and the filter behaves like a straight piece of wire with the inductance of the windings canceling out.

Figure 6:
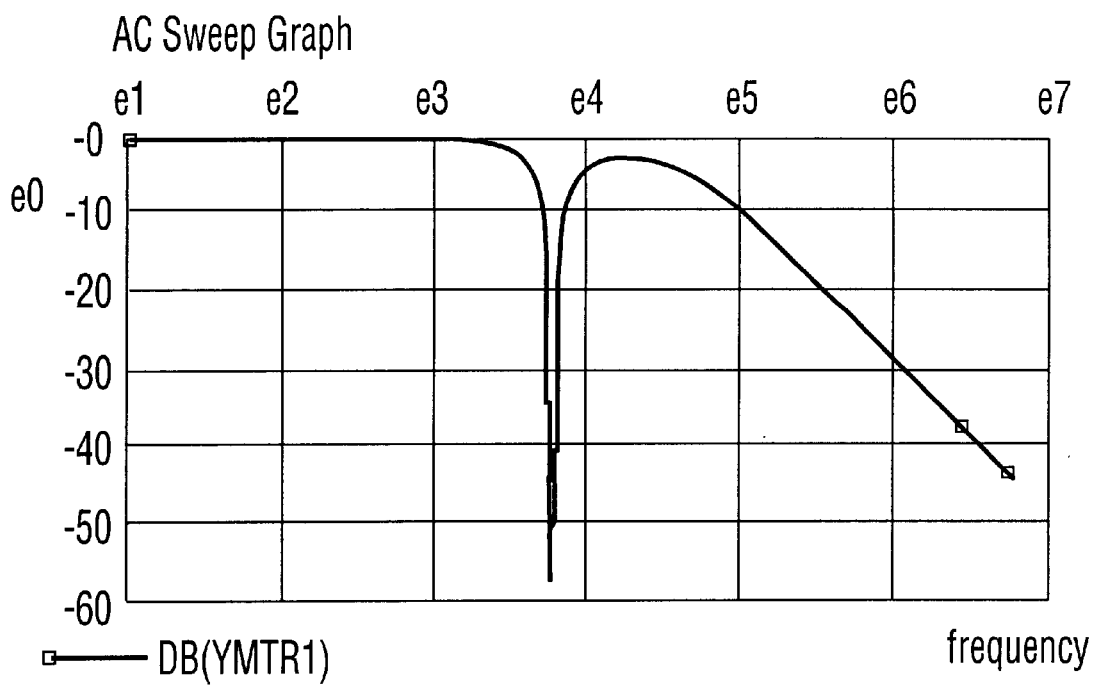
FIG. 6 shows the frequency response of the filter shown in FIG. 5.

The frequency response of this circuit is shown in FIG. 6. It will be seen that it is essentially flat below about 2 KHz with essentially zero loss.

Figure 7:
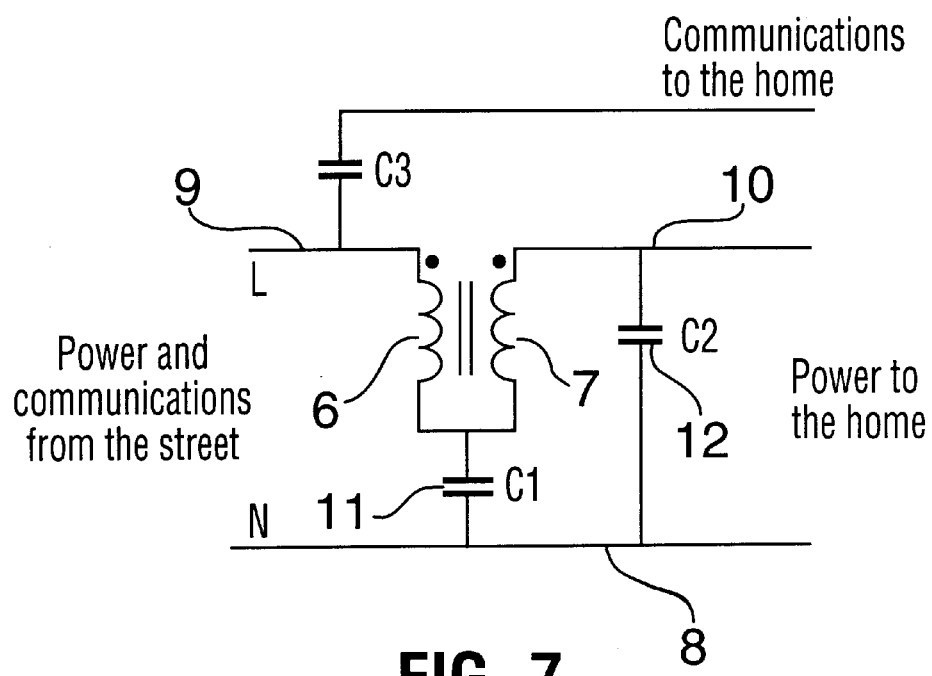
FIG. 7 shows the filter of FIG. 5 with additional capacitors added.
Figure 8:
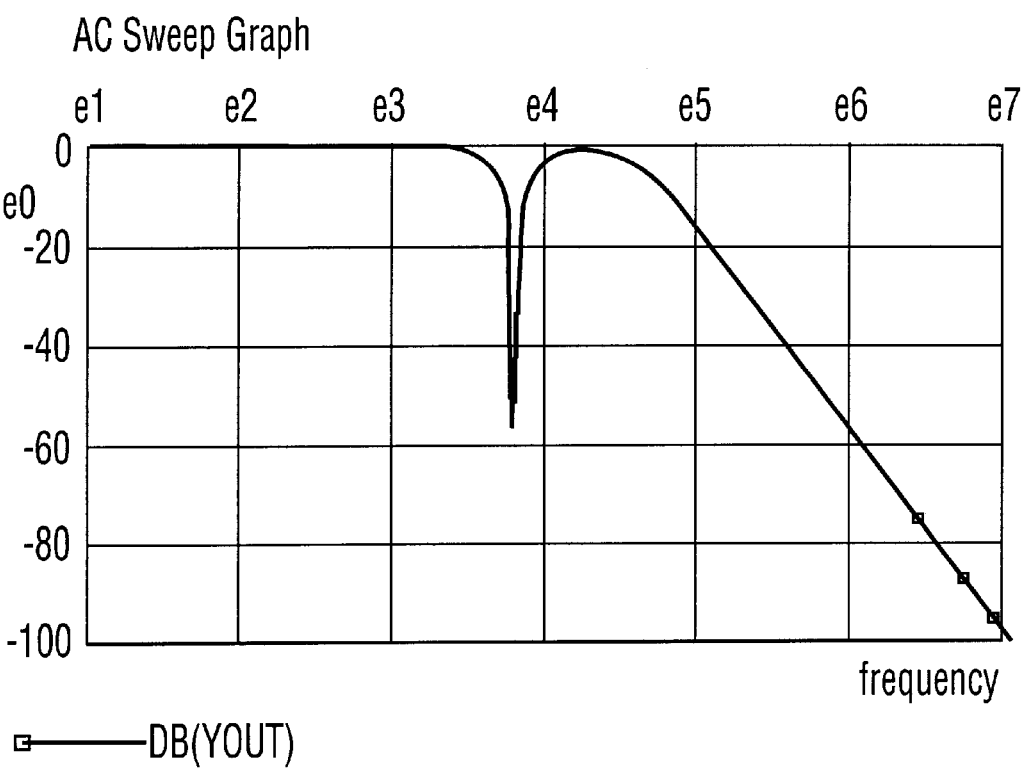
FIG. 8 shows the frequency response of the circuit shown in FIG. 7.

FIG. 7 shows a more complete circuit where an output capacitor 12 (0.1$\mu$F) (C2) has been added to the power output to improve further the attenuation and a high pass filter 13 has been added to the communications output. The frequency response is shown in FIG. 8. Fuses F1 and F2 are added in case the capacitors short.

Figure 9:
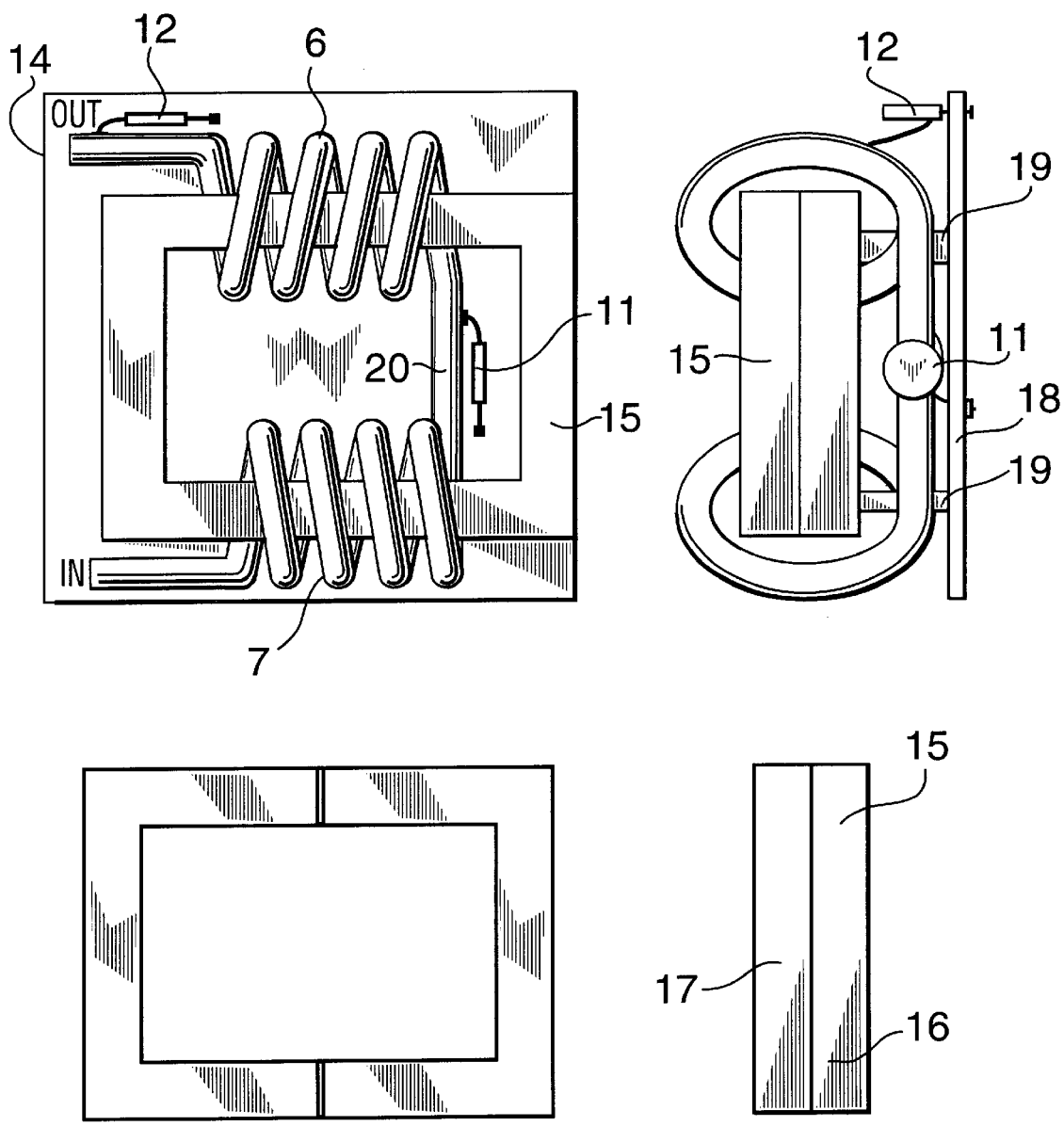
FIG. 9 is an illustration of a practical filter in accordance with the invention.

The physical design of the circuit is shown in FIG. 9. The filter should be small in physical size since for certain applications it is desirable to install the unit behind a conventional electricity meter.

In the filter shown in FIG. 9, the primary and secondary windings 6, 7 consists of two coils of four turns each wound from a single length of wire on a separate jig. The wire is approximately 0.25" in diameter. This is a convenient manufacturing technique. The filter would work equally well if not wound from a single piece of wire.

The core 15 consists of a split U-shaped core or a split toroid. It has little or no air gap. The core material is Fair-Rite Corp Type 43. This has a permeability factor of approximately 800 up to 5 MHz. Additionally, the core 15 consists of a pair of side-by-side pieces 16, 17. These increase the thickness of the core and thus the length of wire per turn, which increases leakage inductance. The core 15 shown in FIG. 4 is rectangular in shape. It has dimensions of 10 cm by 7.5 cms by 2.5 cms. Of course a unitary core with appropriate dimensions can also be employed.

The wire forming the windings 6, 7 is approximately 0.25" in diameter. It is #2 gauge and has a resistance of 0.17$\Omega$/1000 ft. The transformer uses 3 feet of wire, giving a total resistance of 0.5 m$\Omega$. The wire is first wound into two coils of 4 turns each in opposition in a separate jig. The wire is thick enough to make the winding assembly self-supporting so that this can be slipped over the separate halves of the core 15.

The core is supported on a fiber glass board 18, on support legs 19 which is copper coated on one side to provide an RF ground plane. This extends parallel to the transformer core in close proximity thereto. Capacitor II having a capacitance of at least 0.02 $\mu$F is connected between the common connecting link 20 for the windings and the ground plane. Capacitor 12 having a capacitance of at least 0.05 $\mu$F (0.06 $\mu$F was used in tests) is similarly connected between the output line and the ground plane.

In order to test the filter a one-turn sense winding was added to the filter core. It was terminated with a 0.1 $\Omega$ resistor to look for residual 60 Hz AC flux when the inductor was passing 12 amperes with an electric kettle as a load. Inspection of the voltage across the resistor with an oscilloscope showed no trace of an ac voltage, indicating complete cancellation of the 60 Hz flux.

RF measurements showed a rejection from input to output of at least 40 dB at frequencies above 3 MHz whether the inductor was carrying load current or not. Additional capacitance at the output improves the rejection at the low frequency end of the high pass band, e.g. just above 1 MHz.

With this arrangement, input impedance was found to be greater than 45 $\Omega$ at the lowest frequency of interest (2 MHz). This is important as it ensures that the wanted signals are not attenuated.

With a total resistance of 0.5 m$\Omega$, at a 200 ampere load, the filter will generate 20 W of heat. This is not an unreasonable amount to dissipate by passive means. Typical house loads are in the region of 50 amperes or less, giving an average heat dissipation of less than 2 W.

The described filter is essentially a short circuited transformer at RF frequencies, and the filtering provided under those conditions is governed by the transformer's leakage inductance. The choice of core geometry ensures maximum physical separation of the primary and secondary windings by winding them at the opposite ends of the core and also ensures a long magnetic path, which increases leakage inductance. Leakage inductance is also increased with the length per turn. The length of each turn is increased by using a generous core cross section. Due to the large wire diameter and the radius of the winding, the wire usage is not quite doubled, which means that resistive losses are not doubled.

High inductance for the primary winding and large leakage relative to frequencies above 1 MHz is achieved while employing a low number of tusns to reduce wire resistance and hence power dissipation with the aid of a high permeability core with little or no air gap. Low frequency saturation is avoided through flux cancellation.

The described filter thus provides an effective means of separating communications signals from power feeds with minimal power consumption.

We claim:

1. A power line communications filter for extracting signal frequencies of at least 1 MHz from power lines, comprising an input terminal, an output terminal, and a common terminal; a transformer having primary and secondary windings, each having one end connected to said respective input and output terminals, and another end connected to a common connection, said windings being wound on a high permeability magnetic core having, a permeability of at least about 800 up to a frequency of about 5 MHz in such a way as to promote flux leakage and with a winding polarity such that the flux in each winding cancels out the flux in the other winding when current flows through said windings in series; and a first capacitor between said common terminal and said common connection of said primary and secondary windings, said first capacitor having a large impedance at low frequencies such that low frequency current flows through both said windings in series and flux cancellation occurs, a second capacitor between said output terminal and said common terminal to increase attenuation at high frequencies, and a third capacitor to extract said high frequency signals at said input terminal, said third capacitor acting as a high pass filter, and said transformer forming with said first capacitor a resonant circuit at frequencies in the order of 1 to 5 KHz.

2. A filter as claimed in claim 1, wherein said second capacitor has a capacitance of at least 0.05 $\mu$F.

3. A filter as claimed in claim 1, wherein the core geometry is such that the primary and secondary windings are physically widely separated.

4. A filter as claimed in claim 1, wherein said primary and secondary windings are wound from a single length of wire.

5. A filter as claimed in claim 1, wherein said first capacitor has a capacitance of at least 0.02 $\mu$F.

6. A filter as claimed in claim 1, further comprising a conductive support providing a common RF ground plane supporting the transformer and extending parallel to the transformer core in close proximity thereto.

7. A filter as claimed in claim 6, wherein said conductive support comprises a copper clad fiberglass board.

8. A method of making a power line communications filter for extracting signal frequencies of at least 1 MHz from power lines, comprising the steps of preparing self-supporting primary and secondary windings having a common connection in a jig, and placing said self-supporting windings in opposition on a high permeability core having a permeability of at least about 800 up to a frequency of about 5 MHz in such a way as to have a high leakage for high frequency attenuation and so that when current flows through both windings in series, the flux from the windings will to cancel out to achieve substantially zero loss at low frequencies, connecting said common connection to a ground plane with a first capacitor having a value such that said transformer and said first capacitor resonate at a frequency of about 1 to 5 KHz, connecting a second capacitor between an output terminal of said secondary winding and a ground plane and connecting a third capacitor to an input of said primary winding to provide a high pass filter for extracting said high frequency signals.

9. A method as claimed in claim 8, wherein said windings consist of a single piece of wire.

10. A method of extracting signal frequencies of at least 1 MHz from power lines, comprising providing a transformer having primary and secondary windings, each having one end connected to respective input and output terminals, and another end connected to a common terminal, said windings being wound on a high permeability magnetic core having a permeability of at least about 800 up to a frequency of about 5 MHz in such a way as to promote flux leakage and with a winding polarity such that the flux in each winding cancels out the flux in the other winding when current flows through said windings in series; providing a first capacitor between said common terminal and said common connection of said primary and secondary windings, said first capacitor having a large impedance at low frequencies such that low frequency current flows through both said windings in series and flux cancellation occurs, providing a second capacitor between said output terminal and said common terminal to increase attenuation at high frequencies, and extracting said high frequency signals at said input terminal through a third capacitor, said third capacitor acting as a high pass filter; and said transformer forming with said first capacitor a resonant circuit at frequencies in the order of 1 to 5 KHz.

\* \* \* \* \*